(12) United States Patent
Koiwai et al.

(10) Patent No.: US 12,513,394 B2
(45) Date of Patent: Dec. 30, 2025

(54) CONTROL APPARATUS THAT PROVIDES IN-FOCUS STATE WITH A TILT OR SHIFT EFFECT, LENS APPARATUS, IMAGE PICKUP APPARATUS, CAMERA SYSTEM, CONTROL METHOD, AND STORAGE MEDIUM

(71) Applicant: CANON KABUSHIKI KAISHA, Tokyo (JP)

(72) Inventors: Kenta Koiwai, Tochigi (JP); Masayasu Mizushima, Tochigi (JP); Yuichiro Kato, Tochigi (JP); Takeo Mori, Tochigi (JP); Akino Moriyoshi, Tochigi (JP); Toshimune Nagano, Saitama (JP); Toru Matsumoto, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 72 days.

(21) Appl. No.: 18/191,379

(22) Filed: Mar. 28, 2023

(65) Prior Publication Data

US 2023/0319402 A1    Oct. 5, 2023

(30) Foreign Application Priority Data

Apr. 5, 2022 (JP) .................................. 2022-062749

(51) Int. Cl.
*H04N 23/67* (2023.01)
*H04N 23/68* (2023.01)

(52) U.S. Cl.
CPC ......... *H04N 23/671* (2023.01); *H04N 23/687* (2023.01)

(58) Field of Classification Search
CPC . H04N 23/671; H04N 23/687; H04N 23/6812
See application file for complete search history.

(56) References Cited

U.S. PATENT DOCUMENTS

| | | | |
|---|---|---|---|
| 10,345,615 B2* | 7/2019 | Okuda | G03B 5/06 |
| 2018/0070016 A1* | 3/2018 | Murakami | H04N 23/687 |
| 2020/0275032 A1* | 8/2020 | Kimura | H04N 23/673 |
| 2020/0304721 A1* | 9/2020 | Sugaya | H04N 23/695 |
| 2021/0067704 A1* | 3/2021 | Chino | H04N 23/58 |
| 2022/0299730 A1* | 9/2022 | Jang | G03B 5/00 |

FOREIGN PATENT DOCUMENTS

| | | |
|---|---|---|
| JP | 2001330766 A | 11/2001 |
| JP | 2008145751 A | 6/2008 |
| JP | 2017161678 A | 9/2017 |
| JP | 2019091027 A | 6/2019 |

* cited by examiner

*Primary Examiner* — Padma Haliyur
(74) *Attorney, Agent, or Firm* — ROSSI, KIMMS & McDOWELL LLP

(57) ABSTRACT

A control apparatus is provided for a camera system that includes an image pickup apparatus including an image sensor and a lens apparatus including an optical system that includes at least one optical member for changing at least one of a tilt effect of tilting a focal plane relative to an imaging plane of the image sensor and a shift effect of moving an imaging range. The control apparatus includes at least one memory that stores a set of instructions, and at least one processor that executes the set of instructions to acquire information on an optical state of the optical system, and correct defocus caused by movement of the at least one optical member using the information on the optical state of the optical system.

14 Claims, 10 Drawing Sheets

CONTROL APPARATUS THAT PROVIDES IN-FOCUS STATE WITH A TILT OR SHIFT EFFECT, LENS APPARATUS, IMAGE PICKUP APPARATUS, CAMERA SYSTEM, CONTROL METHOD, AND STORAGE MEDIUM

BACKGROUND

Technical Field

One of the aspects of the disclosure relates to a control apparatus, a lens apparatus, an image pickup apparatus, a camera system, a control method, and a storage medium.

Description of Related Art

Some conventionally proposed optical systems can acquire a tilt effect of tilting a focal plane for entirely excellent focusing on an object plane that is tilted relative to an optical axis of an imaging optical system, and a shift effect of moving an imaging range. Japanese Patent Laid-Open No. (JP) 2019-91027 discloses an optical system configured to acquire the tilt effect and the shift effect by moving two optical elements in a direction orthogonal to the optical axis.

However, the optical system disclosed in JP 2019-91027 does not consider defocus amount changes due to movements of the optical elements in the direction orthogonal to the optical axis, and thus may causes a defocus state if moving the optical elements in the direction orthogonal to the optical axis in order to acquire the tilt effect and the shift effect after focusing is completed.

SUMMARY

One of the aspects of the present disclosure provides a control apparatus that can provide an in-focus state with a tilt or shift effect.

A control apparatus according to one aspect of the disclosure is provided for a camera system that includes an image pickup apparatus including an image sensor and a lens apparatus including an optical system that includes at least one optical member for changing at least one of a tilt effect of tilting a focal plane relative to an imaging plane of the image sensor and a shift effect of moving an imaging range. The control apparatus includes at least one memory that stores a set of instructions, and at least one processor that executes the set of instructions to acquire information on an optical state of the optical system, and correct defocus caused by movement of the at least one optical member using the information on the optical state of the optical system. A lens apparatus, an image pickup apparatus, and a camera system each including the above control apparatus also constitutes another aspect of the disclosure. A control method corresponding to the above control apparatus also constitutes another aspect of the disclosure. A non-transitory computer-readable storage medium storing a program that causes a computer to execute the above control method also constitutes another aspect of the disclosure.

Further features of the disclosure will become apparent from the following description of embodiments with reference to the attached drawings. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

DESCRIPTION OF THE EMBODIMENTS

Figure 1A:
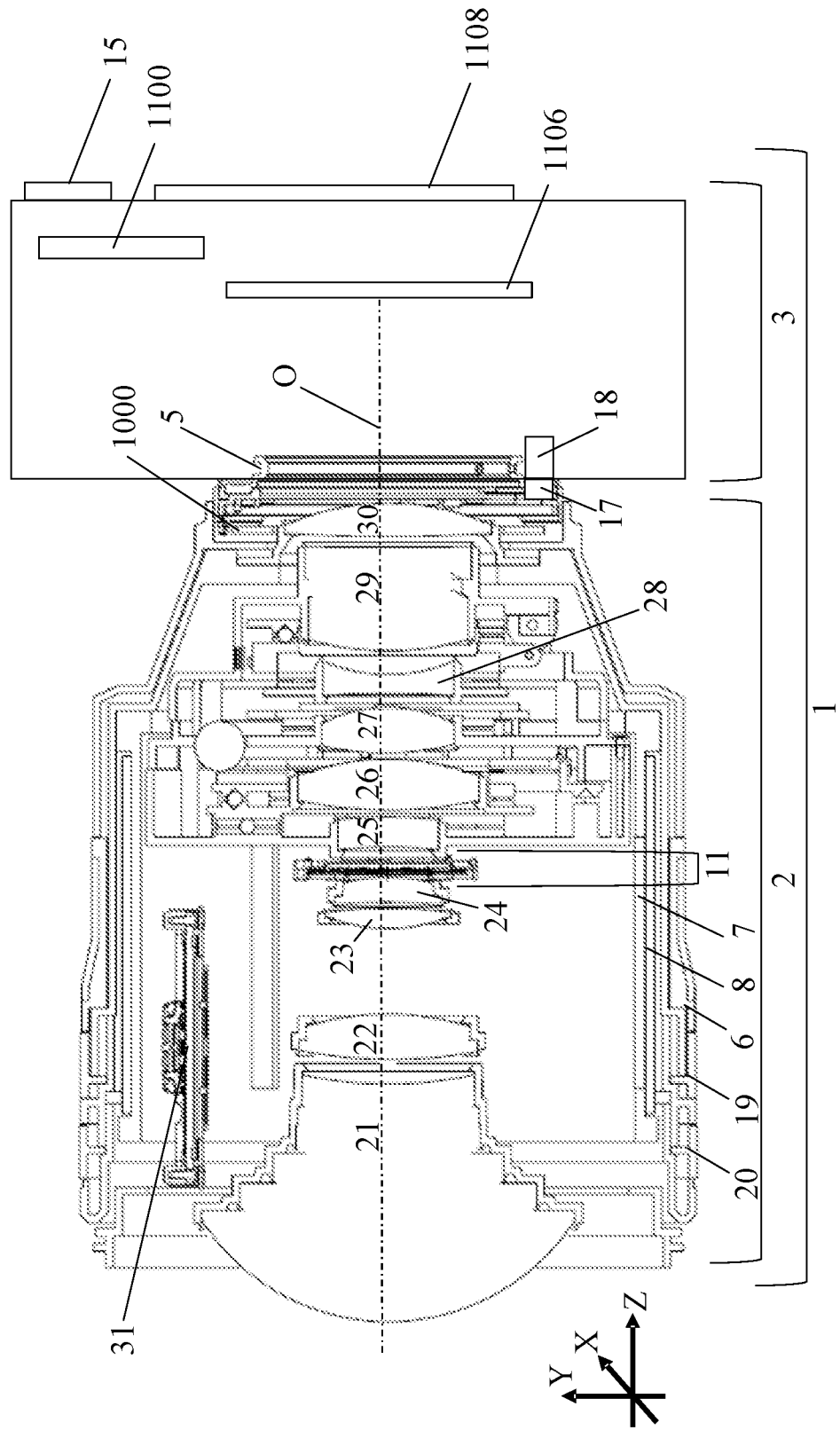
FIG. 1A is a sectional view of a camera system according to a first embodiment.

Referring now to the accompanying drawings, a detailed description will be given of embodiments according to the disclosure. Corresponding elements in respective figures will be designated by the same reference numerals, and a duplicate description thereof will be omitted.

First Embodiment

FIG. 1A is a sectional view of a camera system 1 according to this embodiment. The camera system 1 includes a lens barrel (lens apparatus) 2 and a camera (image pickup apparatus) 3. The lens barrel 2 and the camera 3 are connected via a mount 5 provided on the lens barrel 2 and an unillustrated mount provided on the camera 3, and can communicate with each other via a lens-side communication unit 17 provided on the lens barrel 2 and a camera-side communication unit 18 provided on the camera 3. The lens-side communication unit 17 and the camera-side communication unit 18 respectively include contacts 1009 and 1010 for supplying power from the camera 3 to the lens barrel 2. In this embodiment, a vertical direction (gravity direction) in FIG. 1A is set to a Y-axis direction. A direction parallel to an optical axis O of an optical system included in the lens barrel 2 is set to a Z-axis direction. A direction orthogonal to the Y-axis direction and the Z-axis direction is set to the X-axis direction.

The camera 3 includes an image sensor 1106, a display unit 1108, a camera CPU 1100, and a viewfinder 15. Since the camera CPU 1100 controls an unillustrated shutter, an image formed through the lens barrel 2 can be exposed to the image sensor 1106 for an arbitrary period and captured. The display unit 1108 displays a captured image and a setting screen for changing various settings of the camera system 1. In this embodiment, the display unit 1108 is provided on the back surface of the camera 3 and has a touch panel function. By looking into the viewfinder 15, the photographer can confirm the captured image and perform visual line input.

The lens barrel 2 includes the optical system, a zoom operation ring 6, a guide barrel 7, a cam barrel 8, a lens CPU 1000, and an aperture (stop) mechanism 11. The optical system includes a first lens unit 21, a second lens unit 22, a third lens unit 23, a fourth lens unit 24, a fifth lens unit 25, a sixth lens unit 26, a seventh lens unit 27, an eighth lens unit 28, a ninth lens unit 29, and a tenth lens unit 30. This embodiment can acquire at least one of a tilt effect of tilting a focal plane relative to the imaging plane of the image sensor 1106 and a shift effect of moving an imaging range by moving at least one lens (optical member) included in the optical system. Each lens is held by a barrel with cam followers. The cam followers are engaged with linear grooves parallel to the optical axis O provided in the guide barrel 7 and grooves inclined to the optical axis O provided in the cam barrel 8. As the zoom operation ring 6 rotates, the cam barrel 8 rotates, and a positional relationship in the Z-axis direction among the lenses changes. Thereby, the focal length of the lens barrel 2 is changed. The focal length of the lens barrel 2 can be detected by an unillustrated zoom position detector that detects a rotating amount of the zoom operation ring 6. The lens CPU 1000 controls the aperture mechanism 11 to change the aperture diameter of the optical system.

The second lens unit 22 is a focus unit (focus member) that performs focusing by moving in the Z-axis direction. The lens CPU 1000 controls the second lens unit 22 via a vibration actuator 31 using a detection signal from a focus position detector (first detector) 410 configured to detect the position of the second lens unit 22, which will be described below.

This embodiment can acquire the tilt effect and the shift effect by moving the sixth lens unit 26 (first optical member) and the eighth lens unit 28 (second optical member) in the direction orthogonal to the optical axis O. More specifically, moving the sixth lens unit 26 and the eighth lens unit 28 in opposite directions produces the tilt effect, and moving them in the same direction produces the shift effect. The lens CPU 1000 controls the sixth lens unit 26 through a driving unit using a signal from a first shift position detector (second detector) 420 configured to detect the position of the sixth lens unit 26, which will be described below. The lens CPU 1000 controls the eighth lens unit 28 through a driving unit using a signal from a second shift position detector (second detector) 430 configured to detect the position of the eighth lens unit 28, which will be described below. A driving unit that moves each of the sixth lens unit 26 and the eighth lens unit 28 is, for example, a stepping motor or a voice coil motor (VCM). The tilt effect can be acquired by tilting (rotating) the lens.

Figure 1B:
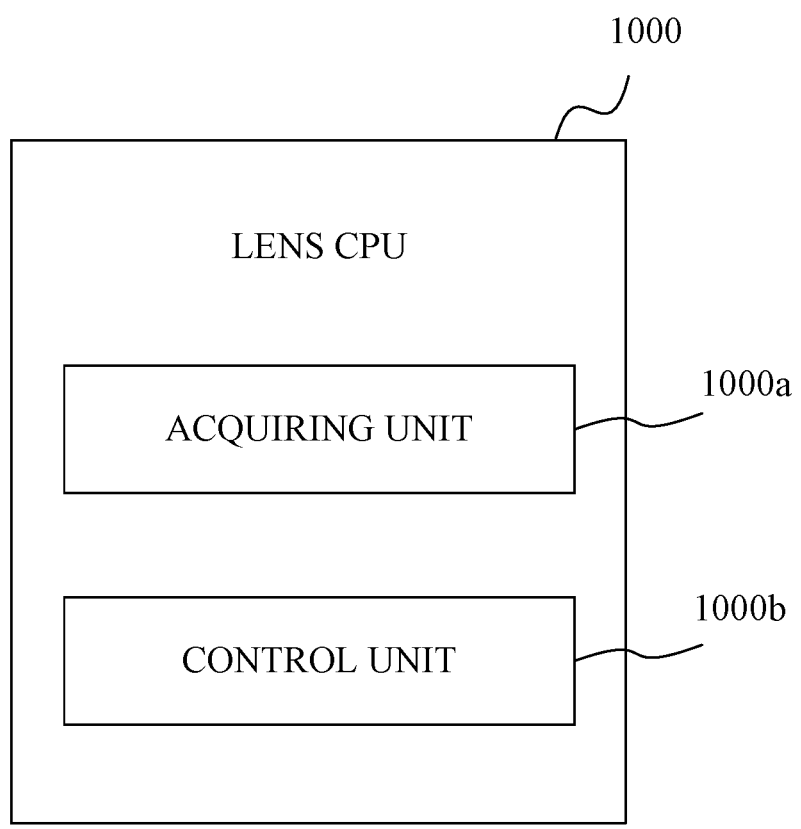
FIG. 1B is a block diagram of a lens CPU.

The lens CPU 1000 includes an acquiring unit 1000a and a control unit 1000b, as illustrated in FIG. 1B, and controls the operation of each component in the lens barrel 2. The acquiring unit 1000a acquires information on the optical state of the optical system. The control unit 1000b corrects defocus caused by movement of at least one optical member using information on the optical state of the optical system. Although the lens CPU 1000 is mounted inside the lens barrel 2 in this embodiment, it may be configured as a control apparatus different from the lens barrel 2. Alternatively, the camera CPU 1100 may include the acquiring unit 1000a and the control unit 1000b.

Figure 2:
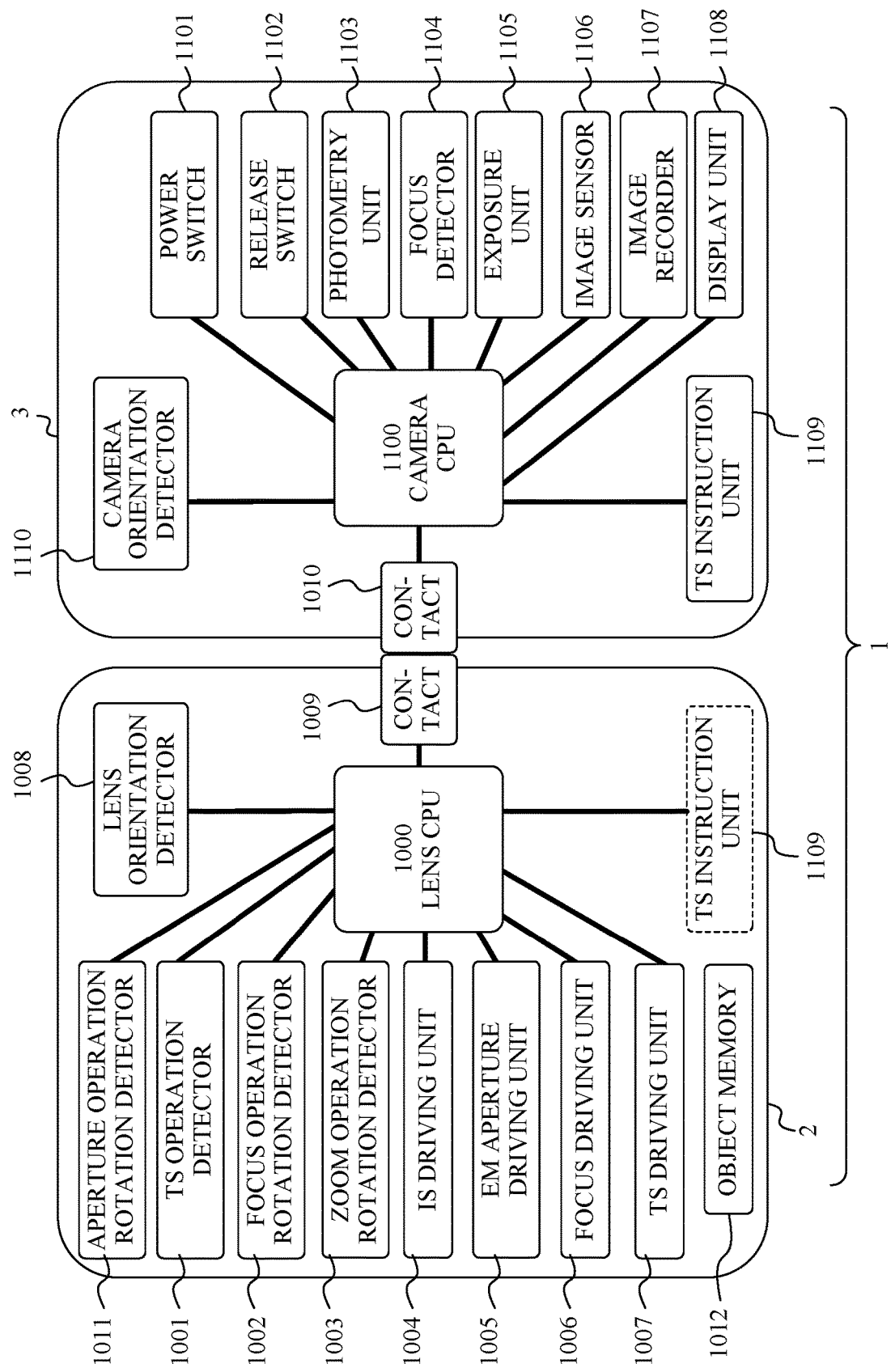
FIG. 2 is an electrical configuration diagram of the camera system.

FIG. 2 is an electrical configuration diagram of the camera system 1. A description will now be given of a control flow inside the camera 3.

The camera CPU 1100 includes a microcomputer and controls the operation of each component within the camera 3. The camera CPU 1100 communicates with the lens CPU 1000 via the lens-side communication unit 17 and the camera-side communication unit 18 in a case where the lens barrel 2 is attached to the camera 3. The information (signal) that the camera CPU 1100 transmits to the lens CPU 1000 includes moving amount information on the second lens unit 22, defocus information, and orientation information on the camera 3 based on a signal from the camera orientation detector 1110 such as an acceleration sensor. The information includes object distance information on the object based on a signal from a tilt-shift (TS) instruction unit 1109 that instructs a desired object that the photographer wishes to focus on, imaging range information that specifies the desired imaging range (field of view), and the like.

The information (signal) transmitted from the lens CPU 1000 to the camera CPU 1100 includes optical information such as the imaging magnification of the lens, lens function information such as zooming and image stabilization mounted on the lens barrel 2, orientation information on the lens barrel 2 based on a signal from a lens orientation detector 1008 such as a gyro sensor or an acceleration sensor, and design information on the optical system such as defocus correction information due to the lens shift.

A power switch 1101 is a switch operable by the photographer, and used to start the camera CPU 1100 and power supply to each actuator, sensor, etc. in the camera system 1. A release switch 1102 is a switch operable by the photographer, and includes a first stroke switch SW1 and a second stroke switch SW2. A signal from the release switch 1102 is input to the camera CPU 1100. The camera CPU 1100 enters an imaging preparation state in response to the input of the ON signal from the first stroke switch SW1. In the imaging preparation state, a photometry unit 1103 measures object luminance and the focus detector 1104 performs focus detection.

The camera CPU 1100 calculates an F-number (aperture value) of the aperture mechanism 11 and an exposure amount (shutter speed) of the image sensor 1106 based on the photometry result of the photometry unit 1103. The camera CPU 1100 also determines a moving amount (including a driving direction) of the second lens unit 22 based on focus information (defocus amount and defocus direction) of the optical system detected by the focus detector 1104. The focus detector 1104 detects the focus information on the optical system from information such as a phase difference and contrast.

This embodiment can acquire the tilt effect and the shift effect, as described above, by moving the sixth lens unit 26 and the eighth lens unit 28 in the direction orthogonal to the optical axis O. The camera CPU 1100 calculates a tilt driving amount for focusing on the desired object instructed by the TS instruction unit 1109. The TS instruction unit 1109 is included in the display unit 1108 having a touch panel function in this embodiment. The camera CPU 1100 also calculates a shift driving amount for changing the current imaging range to the imaging range instructed by the TS instruction unit 1109. The camera CPU 1100 transmits the acquired information about the driving amount to the lens CPU 1000. The sixth lens unit 26 and the eighth lens unit 28 are controlled based on the information on the driving amount described above.

A plurality of objects may be instructed by the TS instruction unit 1109. In a case where objects at different distances are instructed, they can be in focus if they are located on the object plane tilted by the tilt effect.

The TS instruction unit 1109 may be provided in the lens barrel 2 instead of the camera 3. The function of the TS instruction unit 1109 may be assigned to an operation unit already provided in the camera system 1. The TS instruction unit 1109 also includes an operation unit for selecting tilt imaging for obtaining the tilt effect or shift imaging for obtaining the shift effect.

In a case where the camera CPU 1100 is set to a predetermined imaging mode, the camera CPU 1100 starts eccentrically driving an unillustrated image stabilizing lens, that is, controlling the image stabilizing operation. In a case where the lens barrel 2 does not have the image stabilizing function, the image stabilizing operation is not performed. The camera CPU 1100 transmits an aperture driving command to the lens CPU 1000 in response to the input of the ON signal from the second stroke switch SW2, and sets the F-number (aperture value) of the aperture mechanism 11 to a pre-acquired F-number. The camera CPU 1100 also sends an exposure start command to an exposure unit 1105 to cause an unillustrated mirror to retract and an unillustrated shutter to open. In a case where the camera 3 is a mirrorless camera, the retraction operation is not performed. The camera CPU 1100 causes the image sensor 1106 to perform photoelectric conversion of an object image, that is, to perform an exposure operation.

An imaging signal from the image sensor 1106 is digitally converted by a signal processing unit in the camera CPU 1100, receives various correction processing, and is output as an image signal. The image signal (data) is stored in an image recorder 1107 such as a semiconductor memory such as a flash memory, a magnetic disk, an optical disc, or the like.

The display unit 1108 can display an image captured by the image sensor 1106 during imaging. The display unit 1108 can display an image recorded in the image recorder 1107.

A description will now be given of a control flow inside the lens barrel 2. A focus operation rotation detector 1002 detects rotation of a focus operation ring 19. An aperture operation rotation detector 1011 detects rotation of an aperture operation ring 20. A zoom operation rotation detector 1003 detects rotation of the zoom operation ring 6. An object memory (storage unit) 1012 stores a spatial position of an object in the imaging range, instructed by the TS instruction unit 1109. The TS operation detector 1001 includes a manual operation unit for obtaining a tilt effect and a shift effect, and a sensor for detecting an operation amount of the manual operation unit. An image stabilization (IS) driving unit 1004 includes a driving actuator for the image stabilizing lens that performs an image stabilizing operation, and a driving circuit for the drive actuator. In a case where the lens barrel 2 has no image stabilizing function, this configuration is unnecessary. A focus driving unit (first moving unit) 1006 includes the second lens unit 22 and the vibration actuator 31 that moves the second lens unit 22 in the Z-axis direction according to moving amount information. The moving amount information may be determined based on a signal from the camera CPU 1100 or may be determined based on a signal output by operating the focus operation ring 19. The moving amount information may be determined based on correction information on defocus that occurs in a case where the sixth lens unit 26 and the eighth lens unit 28 are shifted in the direction orthogonal to the optical axis O. An electromagnetic (EM) aperture driving unit 1005 changes the aperture mechanism 11 to an aperture state corresponding to the instructed F-number according to an instruction from the lens CPU 1000 that has received an aperture driving command from the camera CPU 1100, or according to an instruction from the photographer via the aperture operation ring 20. The TS driving unit 1007 moves the sixth lens unit 26 and the eighth lens unit 28 in accordance with an instruction from the lens CPU 1000 based on the object distance, position information, and imaging range information from the camera CPU 1100. The lens barrel 2 has optical characteristics such that the shift operations of the sixth lens unit 26 and the eighth lens unit 28 change the focus state even if the object distance does not change. The lens CPU 1000 controls the TS driving unit 1007 and the focus driving unit 1006 to optimally operate in order to obtain the desired focus state according to the optical characteristics.

A gyro sensor is electrically connected to the lens CPU 1000 inside the lens barrel 2. The gyro sensor detects angular velocities of vertical (pitch direction) shake and horizontal (yaw direction) shake, which are angular shakes of the camera system 1, and outputs the detected values to the lens CPU 1000 as angular velocity signals. The lens CPU 1000 electrically or mechanically integrates angular velocity signals in the pitch direction and the yaw direction from the gyro sensor, and calculates a displacement amount in each direction, namely, a pitch-direction shake amount and a yaw-direction shake amount (collectively, angular shake amount).

The lens CPU 1000 controls the IS driving unit 1004 based on the combined displacement amount of the angular shake amount and the parallel shake amount to move an unillustrated image stabilizing lens and correct angular and parallel shakes. In a case where the lens barrel 2 has no image stabilization function, this configuration is unnecessary.

Figure 3A:
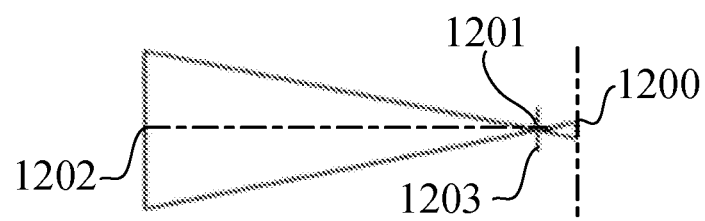
FIGS. 3A to 3C explain the Scheimpflug principle.
Figure 3B:
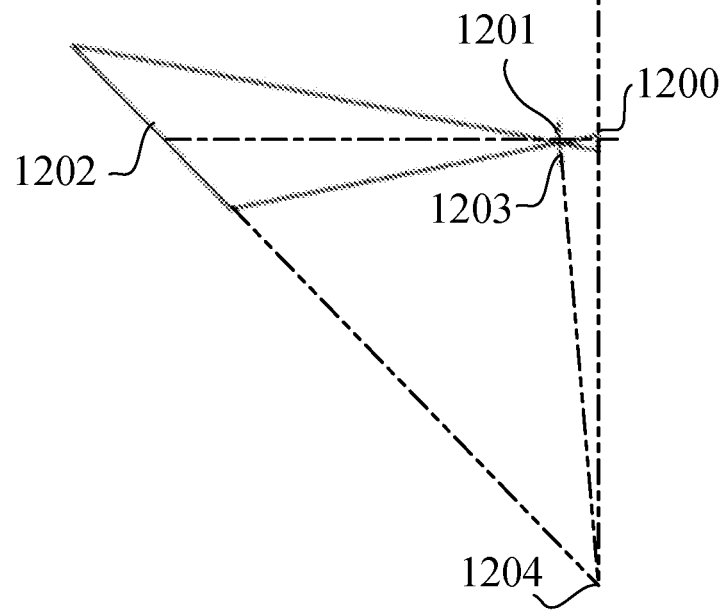
Figure 3C:
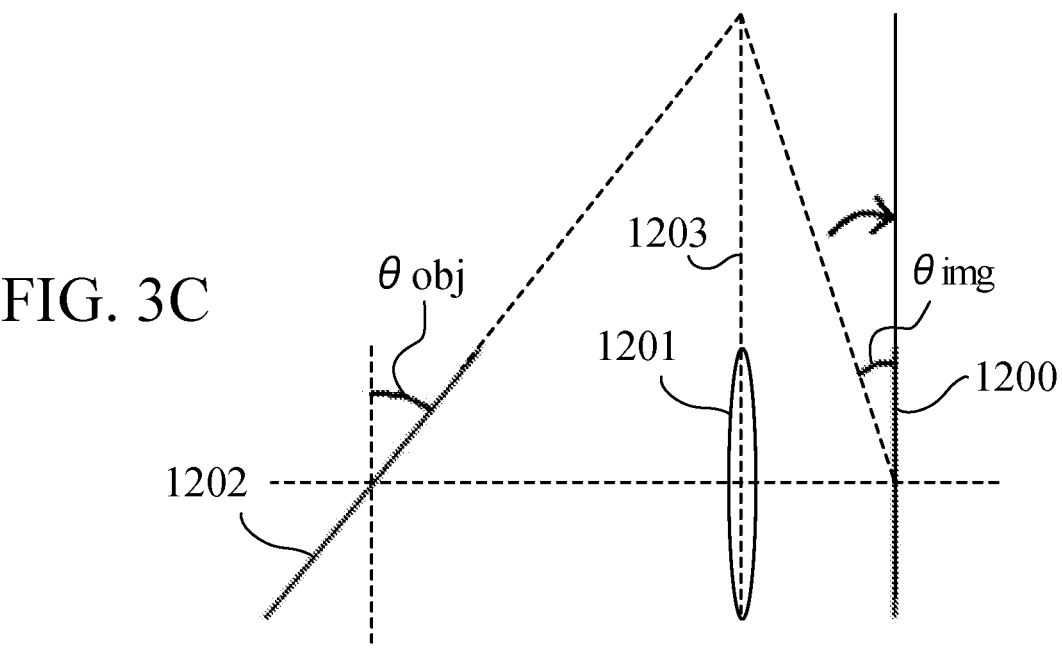

Referring now to FIGS. 3A to 3C, a description will be given of the Scheimpflug principle. FIG. 3A illustrates an in-focus range in a case where an optical axis of an optical system 1201 is not tilted relative to an imaging plane 1200. FIG. 3B illustrates an in-focus range in a case where the optical axis of the optical system 1201 is tilted relative to the imaging plane 1200. The Scheimpflug principle states that in a case where the imaging plane 1200 and a principal plane 1203 of the optical system intersect at an intersection 1204 as illustrated in FIG. 3B, an in-focus object plane 1202 passes through the intersection 1204. Therefore, in a case where the optical axis of the optical system 1201 is tilted relative to the imaging plane 1200, the in-focus range on the object side is determined according to the Scheimpflug principle. In a case where an object to be imaged has a depth, tilting the object plane 1202 along that depth can provide an in-focus state from the near side to the far side of the object. On the other hand, tilting the principal plane 1203 of the optical system 1201 in the direction opposite to the inclination of the object having the depth can make the object plane 1202 intersect the depth direction of the object at an angle close to a right angle. In this case, the in-focus range can be made extremely narrow, so a diorama-like image can be acquired.

As illustrated in FIG. 3C, this embodiment generates tilt Oobj of the object plane 1202 without tilting the imaging plane 1200 by the image plane tilt Oimg, utilizing the image plane tilt caused by the eccentricity of the optical system 1201. However, in a case where the tilt Oobj of the object plane 1202 is generated only by the optical system 1201, an eccentricity amount of the optical system 1201 increases and the composition significantly shifts. Accordingly, a lens designed to reduce aberration fluctuations during decentering may be decentered. In order to change the tilt effect, this embodiment decenters the sixth lens unit 26 configured to generate the tilt of the object plane and the eighth lens unit 28 configured to reduce aberration fluctuations during eccentricity.

A description will now be given of a method of correcting the defocus that occurs in a case where the sixth lens unit 26 and the eighth lens unit 28 are moved in the direction orthogonal to the optical axis O.

Figure 4:
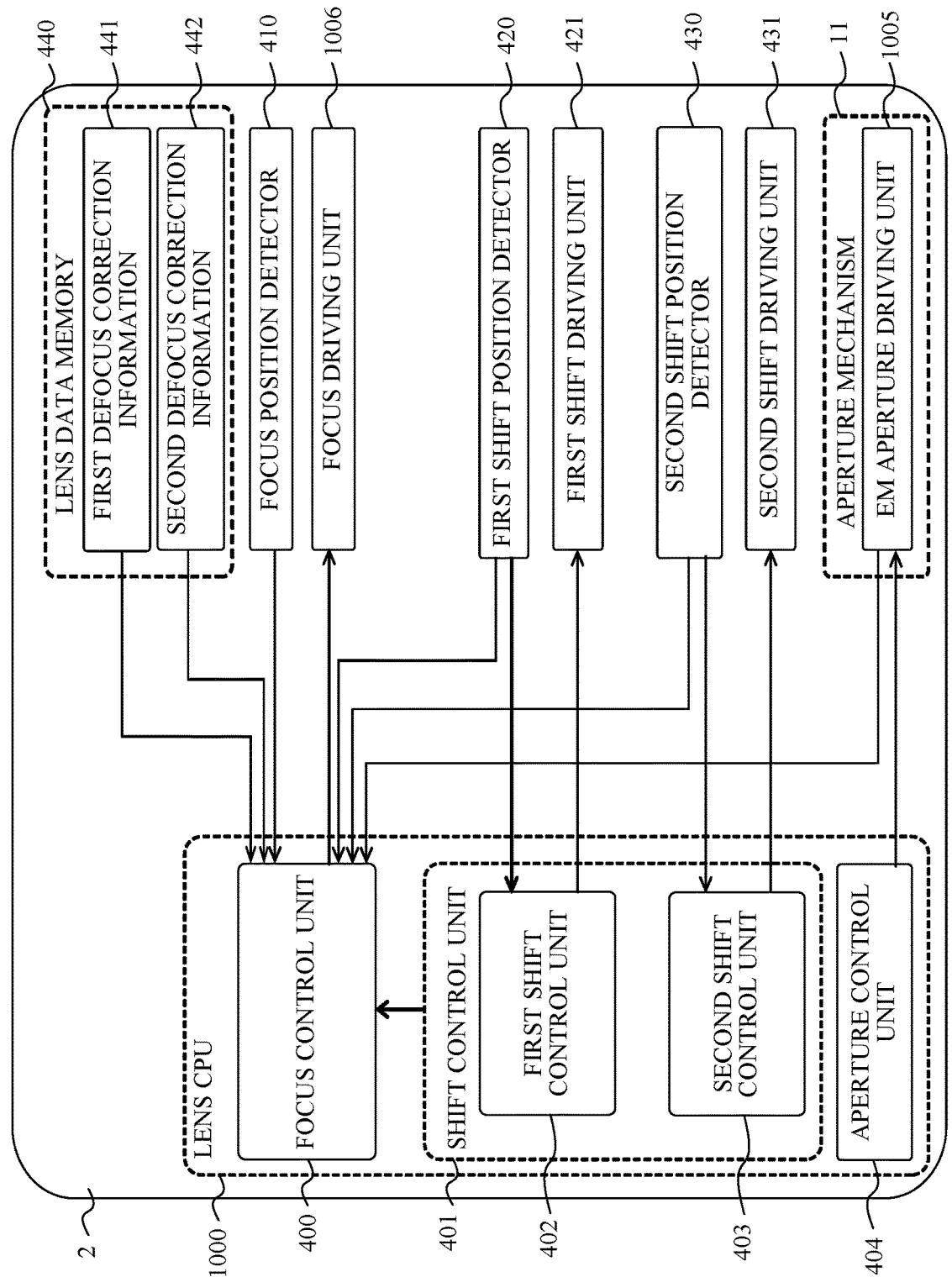
FIG. 4 illustrates a configuration necessary to correct defocus in the first embodiment.

FIG. 4 illustrates a configuration necessary for correcting the defocus according to this embodiment. The lens CPU 1000 includes a focus control unit 400, a shift control unit 401, and an aperture control unit 404. The shift control unit 401 includes a first shift control unit 402 and a second shift control unit 403.

A focus driving unit 1006 moves the second lens unit 22 according to an instruction from the focus control unit 400. A focus position detector 410 detects the current position of the second lens unit 22 and outputs the detection result to the focus control unit 400.

A first shift driving unit (second moving unit) 421 moves the sixth lens unit 26 according to an instruction from the first shift control unit 402. A first shift position detector (second detector) 420 detects the current position of the sixth lens unit 26 and outputs the detection result to the first shift control unit 402.

A second shift driving unit (second moving unit) 431 moves the eighth lens unit 28 according to an instruction from the second shift control unit 403. A second shift position detector (second detector) 430 detects the current position of the eighth lens unit 28 and outputs the detection result to the second shift control unit 403.

The first shift driving unit 421 and the second shift driving unit 431 are included in the TS driving unit 1007.

The aperture mechanism 11 includes an electromagnetic (EM) aperture (stop) driving unit 1005. The electromagnetic aperture driving unit 1005 drives the aperture mechanism 11 according to an instruction from the aperture control unit 404 and changes an aperture state to correspond to the instructed F-number. The lens CPU 1000 can acquire the F-number of the aperture mechanism 11 (information about the aperture mechanism 11), which is information on the optical state of the optical system.

Figure 5A:
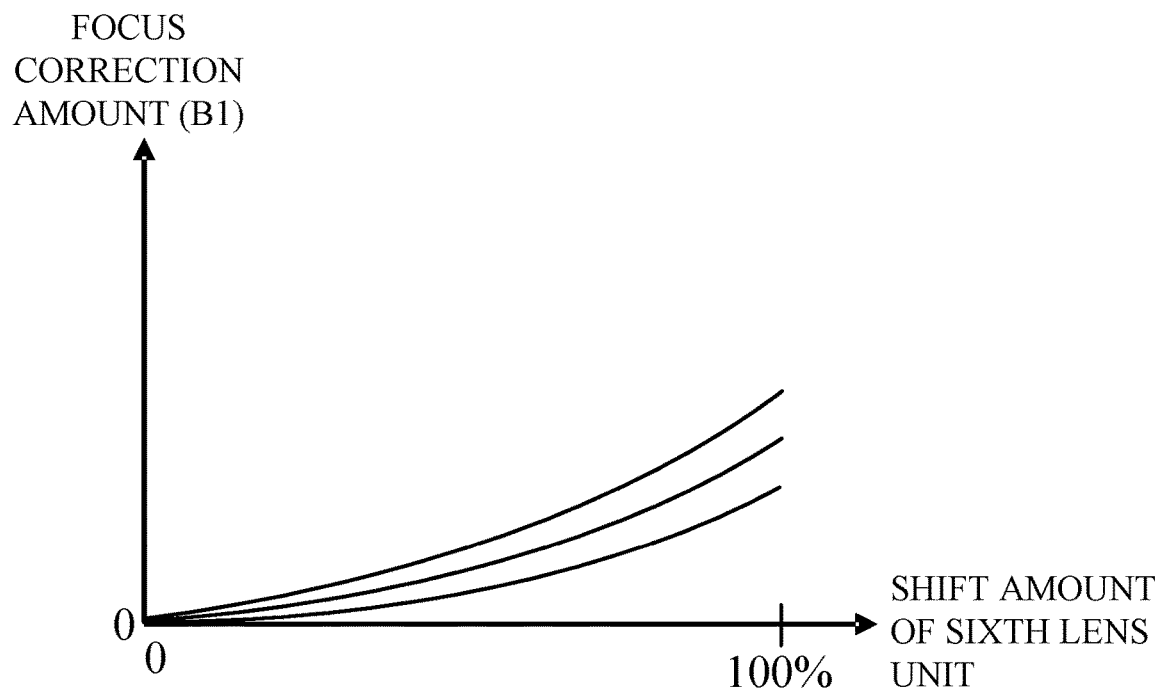
FIGS. 5A and 5B illustrate defocus correction information in the first embodiment.
Figure 5B:
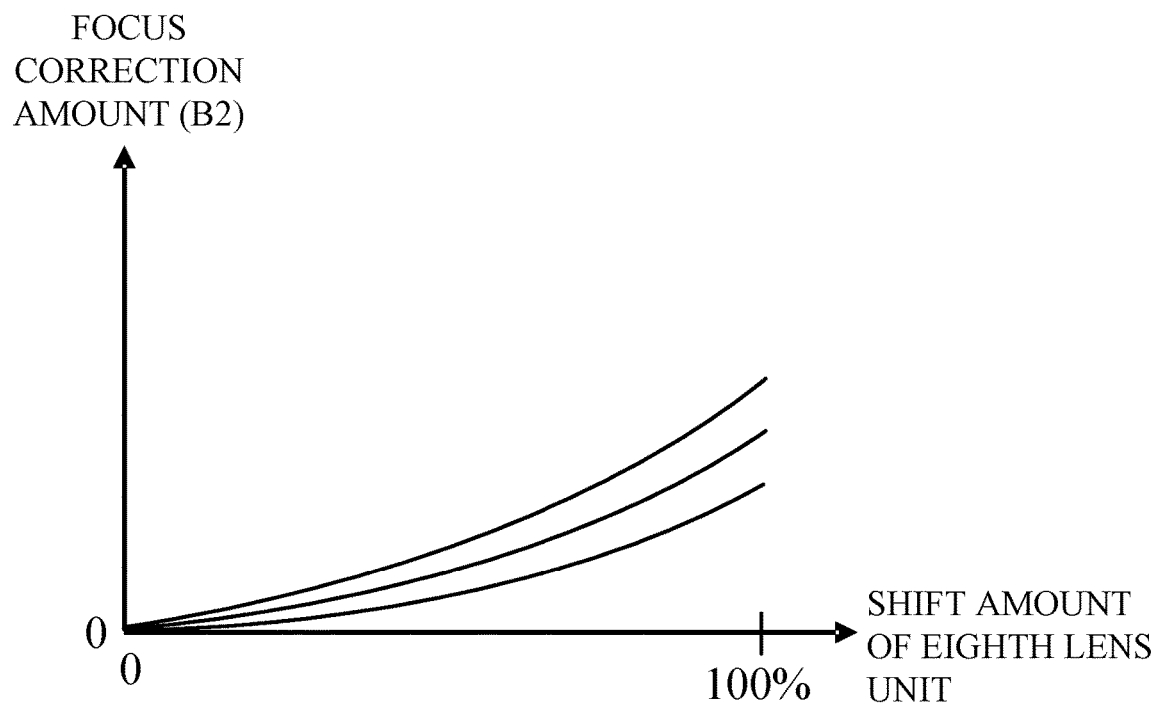

A lens data memory (storage unit) 440 stores first defocus correction information 441 and second defocus correction information 442, which are optical system design information. As illustrated in FIG. 5A, the first defocus correction information 441 includes a table that stores information on a focus correction amount B1 corresponding to a shift amount of the sixth lens unit 26 in the direction orthogonal to the optical axis O for each position of the second lens unit 22. Each line in FIG. 5A illustrates a different position of the second lens unit 22. As illustrated in FIG. 5B, the second defocus correction information 442 includes a table that stores information on a focus correction amount B2 corresponding to a shift amount of the eighth lens unit 28 in the direction orthogonal to the optical axis O for each position of the second lens unit 22. Each line in FIG. 5B illustrates a different position of the second lens unit 22. The focus correction amount is 0 in a case where the shift amount is 0. The focus correction amount and the shift amount may be relative values or absolute values. The focus correction amount may be an absolute value or a relative value of the defocus amount. The first defocus correction information 441 and the second defocus correction information 442 may include tables or may include information obtained from mathematical formulas or the like. Using the first defocus correction information 441 and the second defocus correction information can accurately correct the defocus that changes according to the focus position.

While the tables are represented in the graphical form in this embodiment, each table may be represented in a tabular form. The table data may be discrete values and values between the discrete values may be interpolated. Each piece of defocus correction information may include a table for each piece of information for each position of the second lens unit 22, such as a table for each object distance. Instead of the shift amount, information on the positions of the sixth lens unit 26 and the eighth lens unit 28 may be used.

The lens data memory 440 may store defocus correction information corresponding to an image height position to be focused and defocus correction information corresponding to information on the aperture stop.

Figure 6:
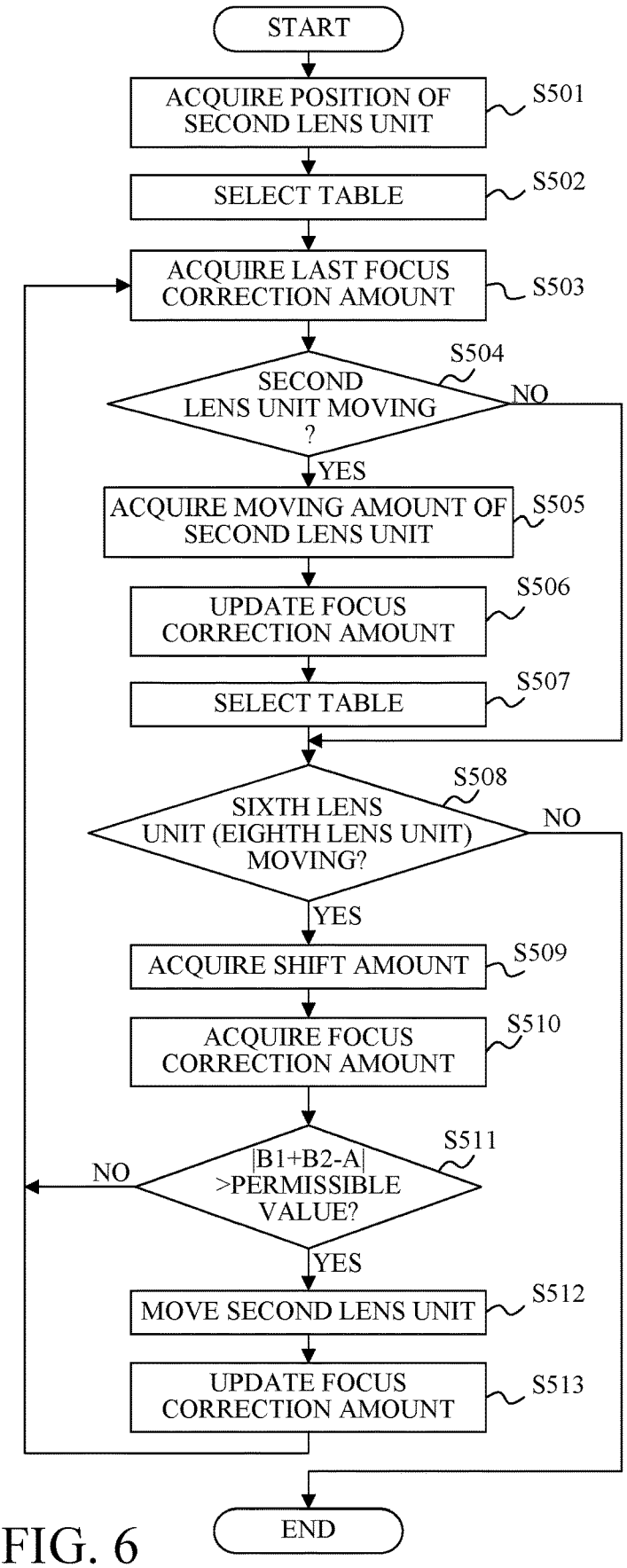
FIG. 6 is a flowchart illustrating a defocus correcting method according to the first embodiment.

FIG. 6 is a flowchart illustrating a defocus correcting method according to this embodiment.

In step S501, the lens CPU 1000 acquires the position of the second lens unit 22 using the output signal of the focus position detector 410 in a case where both the sixth lens unit 26 and the eighth lens unit 28 are located at the center (the shift amount is 0), which is information on the optical state of the optical system.

In step S502, the lens CPU 1000 selects a table to be used from a plurality of tables included in the first defocus correction information 441 (second focus correction information 442) using the position of the second lens unit 22 acquired in step S501.

In step S503, the lens CPU 1000 acquires the last focus correction amount A. For example, the focus correction amount A is 0 before the sixth lens unit 26 and the eighth lens unit 28 are shifted.

In step S504, the lens CPU 1000 determines whether the second lens unit 22 is moving. In a case where it is determined that the second lens unit 22 is moving, the flow proceeds to step S505; otherwise, the flow proceeds to step S508. For example, in a case where the object to be imaged is changed and the focus position is changed, the table to be used needs to be changed. However, the this step can correct the defocus with high accuracy.

In step S505, the lens CPU 1000 acquires a moving amount F of the second lens unit 22, which is information on the optical state of the optical system, using the output signal from the focus position detector 410.

In step S506, the lens CPU 1000 updates the focus correction amount A to the sum of the focus correction amount A obtained in step S503 and the moving amount F obtained in step S505.

In step S507, the lens CPU 1000 selects a table to be use among a plurality of tables included in the first defocus correction information 441 (second focus correction information 442) using the focus correction amount A and the shift amount of the sixth lens unit 26 (eighth lens unit 28).

In step S508, the lens CPU 1000 determines whether the sixth lens unit 26 (eighth lens unit 28) is being moved. In a case where it is determined that the sixth lens unit 26 (eighth lens unit 28) is being moved, the flow proceeds to step S509; otherwise, this flow ends.

In step S509, the lens CPU 1000 acquires the shift amount of the sixth lens unit 26 (the eighth lens unit 28), which is information on the optical state of the optical system, using the output signal of the first shift position detector 420 (second shift position detector 430).

In step S510, the lens CPU 1000 acquires the focus correction amount B1 (focus correction amount B2) corresponding to the shift amount of the sixth lens unit 26 (eighth lens unit 28) acquired in step S509 using the table selected in step S507.

In step S511, the lens CPU 1000 determines whether the absolute value of a value (B1+B2−A) is larger than a permissible value. The permissible value is determined, for example, based on the minimum drivable unit of the focus driving unit 1006 or the permissible depth of field. The depth of field is determined, for example, based on an F-number, a permissible circle of confusion, and the like. In case where the absolute value of the value (B1+B2−A) is determined to be larger than the permissible value, the flow proceeds to step S512, and in a case where the absolute value of the value (B1+B2−A) is determined to be smaller than the permissible value, the flow returns to step S503. In a case where the absolute value of the value (B1+B2−A) is equal to the permissible value, which step to proceed to can be arbitrarily set.

In step S512, the lens CPU 1000 causes the focus control unit 400 to move the second lens unit 22 by the value (B1+B2−A) via the focus driving unit 1006.

In step S513, the lens CPU 1000 updates the focus correction amount A to the value (B1+B2−A).

Here, information on the position of the second lens unit 22 may be used instead of the position and moving amount of the second lens unit 22. Information on the position of the second lens unit 22 may be obtained, for example, by using an input signal to the focus driving unit 1006, may be obtained from object distance information, or may be obtained by using a signal from the focus operation rotation detector 1002. Instead of the shift amount of the sixth lens unit 26, information on the position of the sixth lens unit 26 may be used. Information on the position of the sixth lens unit 26 may be obtained, for example, by using an input signal to the first shift driving unit 421, or may be obtained by using a signal from the TS operation detector 1001 or the TS instruction unit 1109. Instead of the shift amount of the eighth lens unit 28, information on the position of the eighth lens unit 28 may be used. Information on the position of the eighth lens unit 28 may be obtained, for example, by using an input signal to the second shift driving unit 431, or may be obtained by using a signal from the TS operation detector 1001 or the TS instruction unit 1109. The information on each position may be acquired by using information on velocity and acceleration. The focus correction amount may be acquired by using the previously acquired shift amounts of the sixth lens unit 26 and the eighth lens unit 28, and after the second lens unit 22 is moved, the sixth lens unit 26 and the eighth lens unit 28 may be shifted. The sixth lens unit 26, the eighth lens unit 28, and the second lens unit 22 may be simultaneously moved. In addition to correcting the defocus by moving the second lens unit 22, the aperture mechanism 11 may be used to correct the defocus by changing the depth of field. The number of shift units is not limited to two and may be one or three or more. Each data may be stored as an absolute value or may be stored as a relative value before and after the change. The defocus may be corrected based on the focus information from the focus detector 1104. The optical element may be moved in the direction orthogonal to the optical axis O by manual operation.

As described above, this embodiment can correct the defocus that occurs in a case where the optical element is moved in the direction orthogonal to the optical axis O, based on the information on the optical state of the optical system. By using a plurality of pieces of defocus correction information according to the focus positions (object distances), this embodiment can correct the defocus with higher accuracy. Since the defocus can be corrected only by the position and motion of the optical element, the defocus correction can be controlled without recognizing the object. Control with little time lag and excellent followability can perform tilt imaging and shift imaging with little defocus even in capturing a moving image. Therefore, the configuration according to this embodiment can maintain the in-focus state with high accuracy with the tilt effect or the shift effect.

Second Embodiment

The basic configuration of the camera system according to this embodiment is similar to that of the camera system 1 according to the first embodiment. This embodiment will describe a configuration different from that of the first embodiment, and a description of the configuration common to that of the first embodiment will be omitted.

Figure 7:
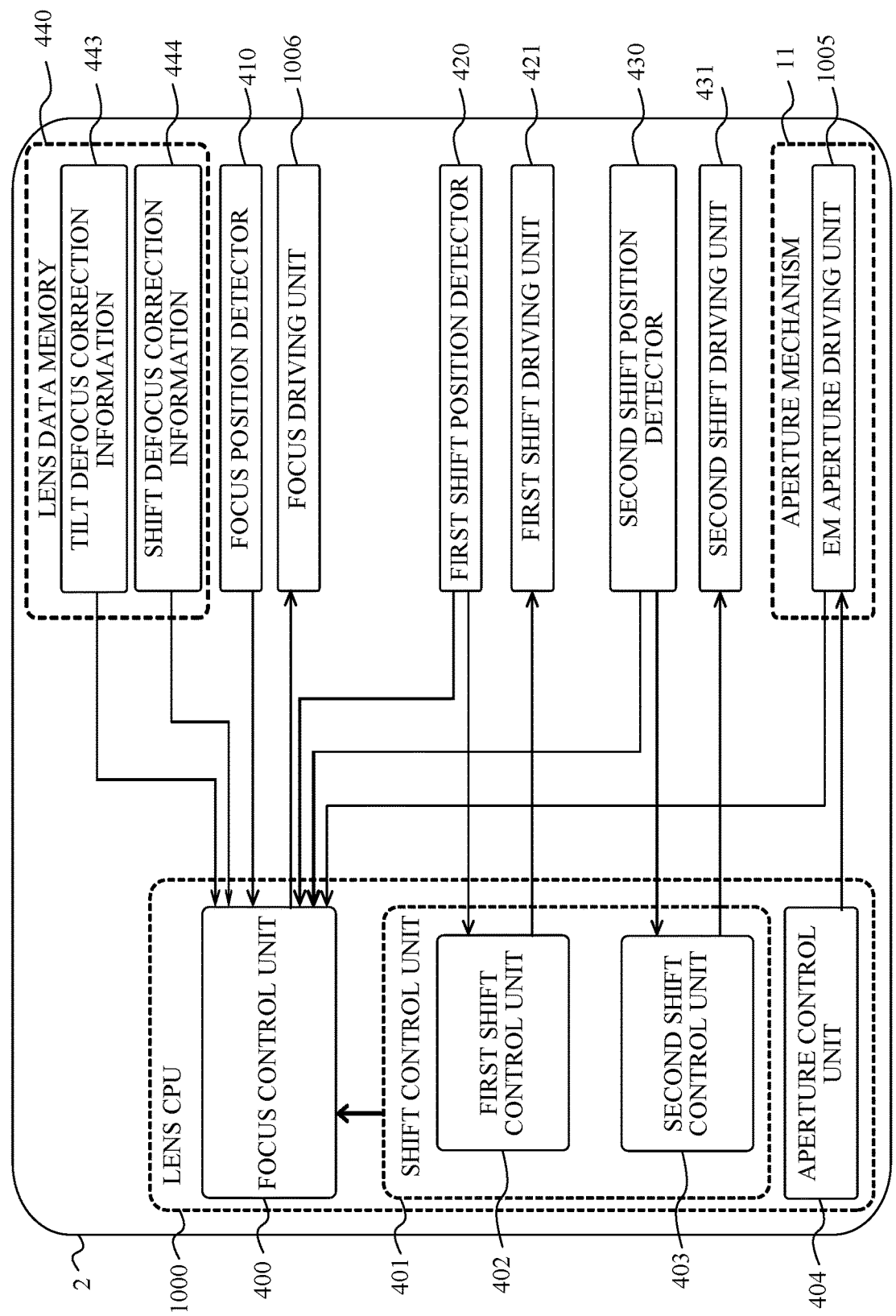
FIG. 7 illustrates a configuration necessary to correct defocus in a second embodiment.
Figure 8A:
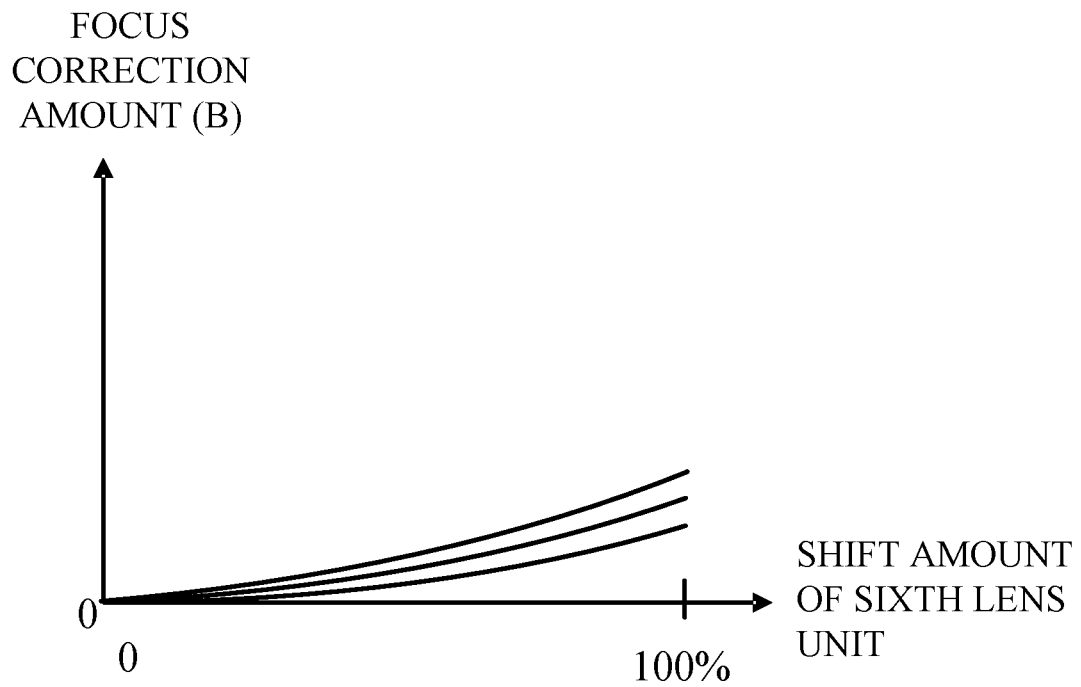
FIGS. 8A and 8B illustrate defocus correction information in the second embodiment.
Figure 8B:
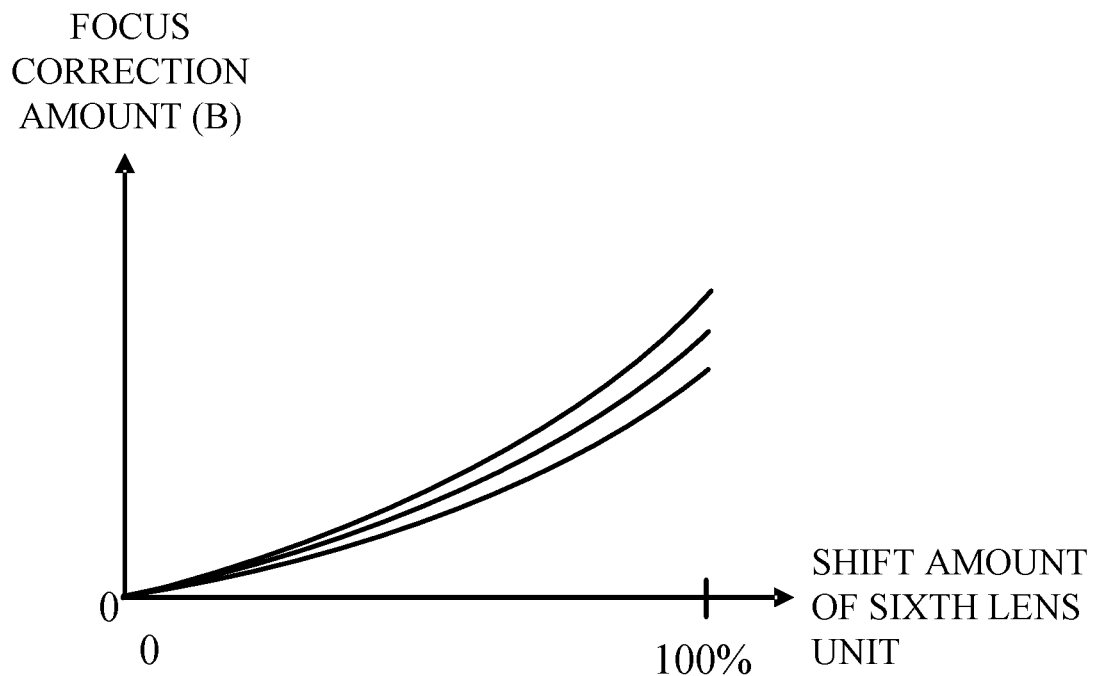

FIG. 7 illustrates a configuration necessary to correct defocus according to this embodiment. The lens data memory 440 stores tilt defocus correction information 443 and shift defocus correction information 444, which are design information on the optical system. As illustrated in FIG. 8A, the tilt defocus correction information 443 includes a table that stores information on the focus correction amount according to the shift amount of the sixth lens unit 26 in the direction orthogonal to the optical axis O in tilt imaging. Each line in FIG. 8A illustrates a different position of the second lens unit 22. The shift defocus correction information 444 includes, as illustrated in FIG. 8B, a table that stores information on the focus correction amount according to the shift amount of the sixth lens unit 26 in the direction orthogonal to the optical axis O in shift imaging. Each line in FIG. 8B illustrates a different position of the second lens unit 22. Since a relationship between the shift amounts of the sixth lens unit 26 and the eighth lens unit 28 is determined in tilt imaging and shift imaging, once the shift amount of the sixth lens unit 26 is obtained, the focus correction amount can be obtained. The tilt defocus correction information 443 and the shift defocus correction information 444 may store a table that store information on the focus correction amount according to the shift amount of the eighth lens unit 28 in the direction orthogonal to the optical axis O.

Figure 9:
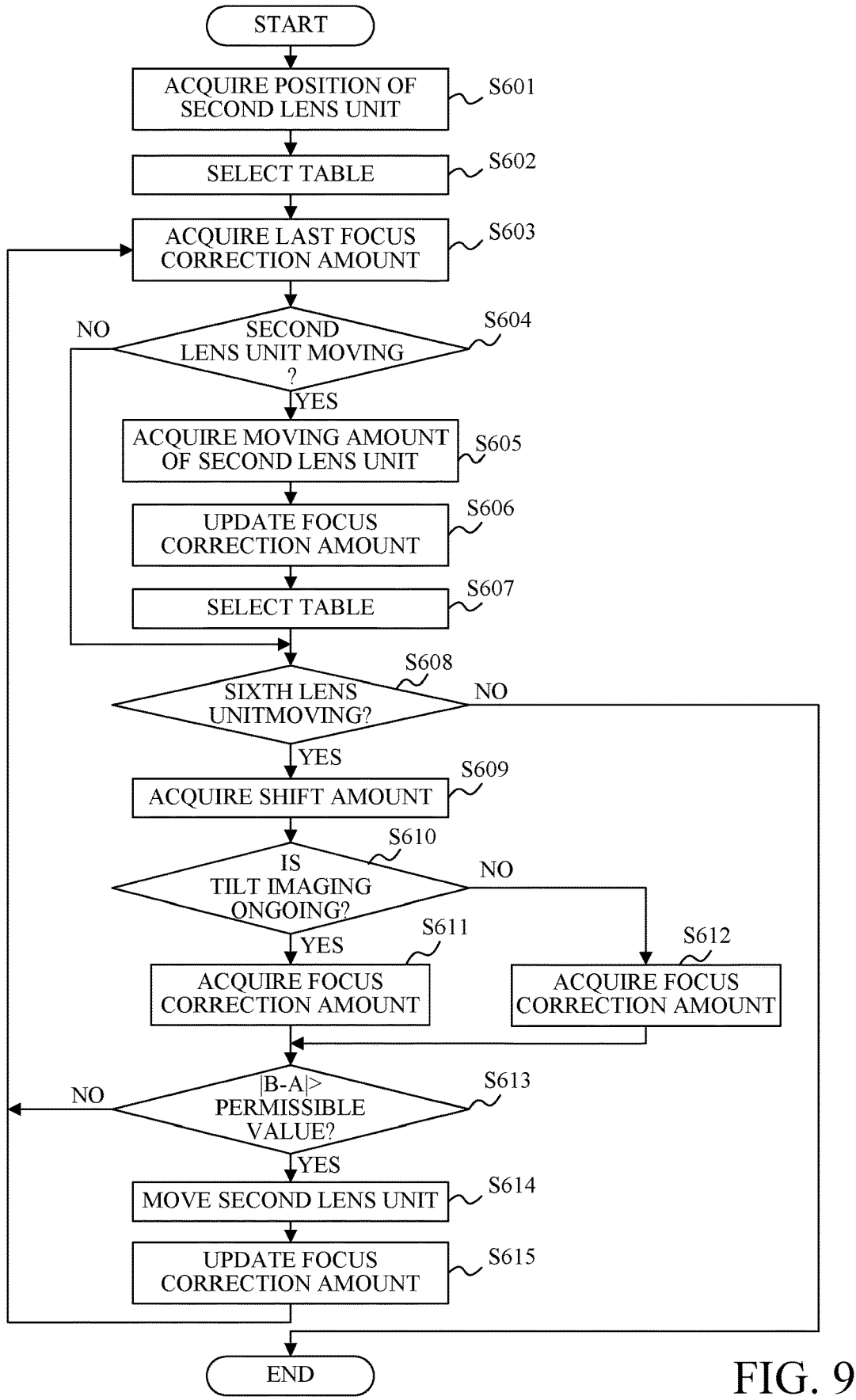
FIG. 9 is a flowchart illustrating a defocus correcting method according to the second embodiment.

FIG. 9 is a flowchart illustrating a defocus correcting method according to this embodiment.

Step S601 is the same as step S501 in FIG. 7, and a detailed description thereof will be omitted.

In step S602, the lens CPU 1000 selects a table to be used from a plurality of tables included in the tilt defocus correction information 443 (shift defocus correction information 444) using the position of the second lens unit 22 acquired in step S501.

Step S603 to step S606 are the same as step S503 to step S506 in FIG. 7, respectively, and a detailed description thereof will be omitted.

In step S607, the lens CPU 1000 selects a table to be used from a plurality of tables included in the tilt defocus correction information 443 (shift defocus correction information 444) using the focus correction amount A and the shift amount of the sixth lens unit 26.

In step S608, the lens CPU 1000 determines whether the sixth lens unit 26 is moving. In a case where it is determined that the sixth lens unit 26 is moving, the flow proceeds to step S609; otherwise, this flow ends.

In step S609, the lens CPU 1000 acquires the shift amount of the sixth lens unit 26, which is information on the optical state of the optical system, using the output signal of the first shift position detector 420.

In step S610, the lens CPU 1000 determines whether or not tilt imaging is ongoing, using information from the TS operation detector 1001, the TS instruction unit 1109, and the like. In a case where it is determined that the tilt imaging is ongoing, the flow proceeds to step S611, and in a case where it is determined otherwise, that is, in a case where it is determined that shift imaging is ongoing, the flow proceeds to step S612.

In step S611, the lens CPU 1000 calculates the focus correction amount B corresponding to the shift amount of the sixth lens unit 26 obtained in step S609 using the table selected from the plurality of tables included in the tilt defocus correction information 443 in step S607.

In step S612, the lens CPU 1000 calculates the focus correction amount B corresponding to the shift amount of the sixth lens unit 26 acquired in step S609 using the table selected from the plurality of tables included in the shift defocus correction information 444 in step S607.

In step S613, the lens CPU 1000 determines whether an absolute value of a value (B−A) is larger than a permissible value. In a case where the absolute value of the value (B−A) is determined to be larger than the permissible value, the flow proceeds to step S614, and in a case where the absolute value of the value (B−A) is determined to be smaller than the permissible value, the flow returns to step S603. In a case where the absolute value of the value (B−A) is equal to the permissible value, which step to proceed to can be arbitrarily set.

In step S614, the lens CPU 1000 causes the focus control unit 400 to move the second lens unit 22 by the value (B−A) via the focus driving unit 1006.

In step S615, the lens CPU 1000 updates the focus correction amount A to the value (B−A).

As described above, this embodiment can correct a defocus state using information on one of the two optical elements to be moved for at least one of the tilt effect and the shift effect by determining whether tilt imaging or shift imaging is ongoing.

This embodiment can provide a control apparatus that can maintain the in-focus state with high accuracy with the tilt effect or the shift effect.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-062749, filed on Apr. 5, 2022, which is hereby incorporated by reference herein in its entirety.

What is claimed is:

1. A control apparatus for a lens apparatus including an optical system that includes a first optical member movable to change at least one of a tilt of a focal plane relative to an imaging plane or a position of an imaging range and a second optical member movable during focusing, the control apparatus comprising:
  at least one memory that stores a set of instructions; and
  at least one processor that executes the set of instructions to:
    control a movement of the first and second optical members;
    acquire first information on (i) a moving amount by which the first optical member is moved and (ii) a position of the second optical member;
    acquire second information on a relationship between (iii) a moving amount of the first optical member and (iv) a moving amount of the second optical member for correcting a defocus corresponding to the moving amount of the first optical member; and
    correct the defocus caused by the movement of the first optical member by moving the second optical member based on the first information and the second information.

2. The control apparatus according to claim 1, wherein the lens apparatus further includes a first detector configured to detect the position of the second optical member, and a first moving unit configured to move the second optical member along an optical axis of the optical system, and
  wherein the first information includes at least one of an output signal from the first detector, an input signal to the first moving unit, and an object distance.

3. The control apparatus according to claim 1,
wherein the lens apparatus further includes a second detector configured to detect a position of the first optical member, and a second moving unit configured to move the first optical member, and
wherein the first information includes at least one of an output signal from the second detector and an input signal to the second moving unit.

4. The control apparatus according to claim 1, wherein the at least one processor corrects the defocus caused by moving the first optical unit to approach an in-focus state of the optical system from an in-focus state of the optical system before moving.

5. The control apparatus according to claim 1, wherein the first optical member is movable in a direction including a component vertical to the optical axis.

6. A lens apparatus comprising:
the control apparatus according to claim 1; and
the optical system.

7. A camera system comprising:
the lens apparatus according to claim 6; and
an image sensor that includes the imaging plane.

8. An image pickup apparatus comprising:
the control apparatus according to claim 1; and
an image sensor that includes the imaging plane.

9. A method for a lens apparatus including an optical system that includes a first optical member movable to change at least one of a tilt of a focal plane relative to an imaging plane or a position of an imaging range and a second optical member movable during focusing, the control method comprising:
controlling a movement of the first and second optical members;
acquiring first information on (i) a moving amount by which the first optical member is moved and (ii) a position of the second optical member;
acquiring second information on a relationship between (iii) a moving amount of the first optical member and (iv) a moving amount of the second optical member for correcting a defocus corresponding to the moving amount of the first optical member; and
correcting the defocus caused by the movement of the first optical member by moving the second optical member based on the first information and the second information.

10. A non-transitory computer-readable storage medium storing a program that causes a computer to execute the method according to claim 9.

11. A control apparatus for a lens apparatus including an optical system that includes a first optical member movable to change at least one of a tilt of a focal plane relative to an imaging plane or a position of an imaging range and an aperture mechanism configured to change an aperture diameter of the optical system, the control apparatus comprising:
at least one memory that stores a set of instructions; and
at least one processor that executes the set of instructions to:
control a movement of the first optical member and a change of the aperture diameter;
acquire first information on (i) a moving amount by which the first optical member is moved and (ii) an aperture value of the optical system;
acquire second information on a relationship between (iii) a moving amount of the first optical member and (iv) a change amount of the aperture value for correcting a defocus corresponding to the moving amount of the first optical member; and
correct the defocus caused by the movement of the first optical member by changing the aperture diameter of the optical system based on the first information and the second information.

12. A lens apparatus comprising:
the control apparatus according to claim 11; and
the optical system.

13. A camera system comprising:
the lens apparatus according to claim 12; and
an image sensor that includes the imaging plane.

14. An image pickup apparatus comprising:
the control apparatus according to claim 11; and
an image sensor that includes the imaging plane.

* * * * *